United States Patent [19]

Hongo et al.

[11] Patent Number: 4,875,218
[45] Date of Patent: Oct. 17, 1989

[54] THIN-FILM COATED WAVEGUIDE LASER

[75] Inventors: Akihito Hongo; Tsuneo Shiota, both of Ibaraki; Shigeo Nishida, Miyagi; Mitsunobu Miyagi, Miyagi; Yoshihiko Wagatsuma, Miyagi, all of Japan

[73] Assignee: Hitachi Cable Ltd., Tokyo, Japan

[21] Appl. No.: 837,120

[22] Filed: Mar. 7, 1986

[30] Foreign Application Priority Data

May 29, 1985 [JP] Japan .................................. 60-115837
Nov. 21, 1985 [JP] Japan .................................. 60-262270

[51] Int. Cl.$^4$ ........................ H01S 3/03; H01S 3/097
[52] U.S. Cl. ...................................... 372/64; 372/82; 372/83; 372/87
[58] Field of Search ................... 372/64, 82, 83, 87; 333/239

[56] References Cited

U.S. PATENT DOCUMENTS

| 3,566,316 | 2/1971 | Sawads et al. | 333/239 |
| 4,169,251 | 9/1979 | Laakmann | 372/83 |
| 4,352,188 | 9/1982 | Griffith | 372/82 |

FOREIGN PATENT DOCUMENTS 103186  6/1983  Japan .......................... 372/9

OTHER PUBLICATIONS

Miyagi et al., "Transmission Characteristics of Dielectric-Coated Metallic Waveguide for Infrared Transmission: Slab Waveguide Model", IEEE Journal of Quantum Electronics, vol. QE19, No. 2, Feb. 1983, pp. 137–145.
Abrams et al., "Characteristics of Sealed-Off Waveguide $CO_2$ Lasers", IEE J. of Quantum Electronics, vol. QE-9, No. 9, Sep. 1973, pp. 940–945.
Smith et al., "Waveguide TEA Laser", Applied Physics Letters, vol. 23, No. 9, Nov. 1, 1973, pp. 524–526.

Primary Examiner—Eugene R. LaRoche
Assistant Examiner—Michael Shingleton
Attorney, Agent, or Firm—Sughrue, Mion, Zinn, Macpeak & Seas

[57] ABSTRACT

A radio frequency (RF) excited waveguide gas laser has a hollow waveguide defined by dielectric or lossy materials and metal electrodes coated by thin films with small absorptions so that the metal electrodes are separated from the filling gas and the waveguide loss is very low. With such thin films on the electrodes, a sealed-off, high-power, compact waveguide gas laser having an extended life is realized.

11 Claims, 3 Drawing Sheets

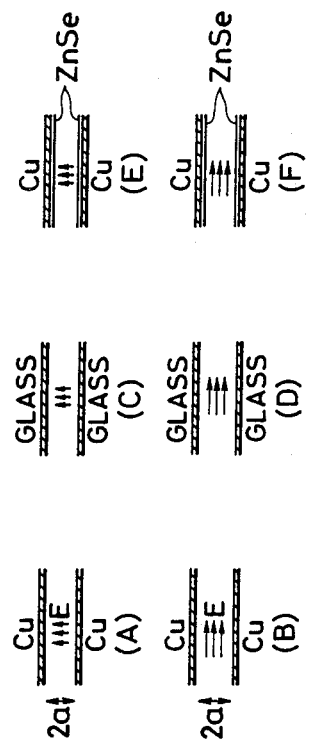
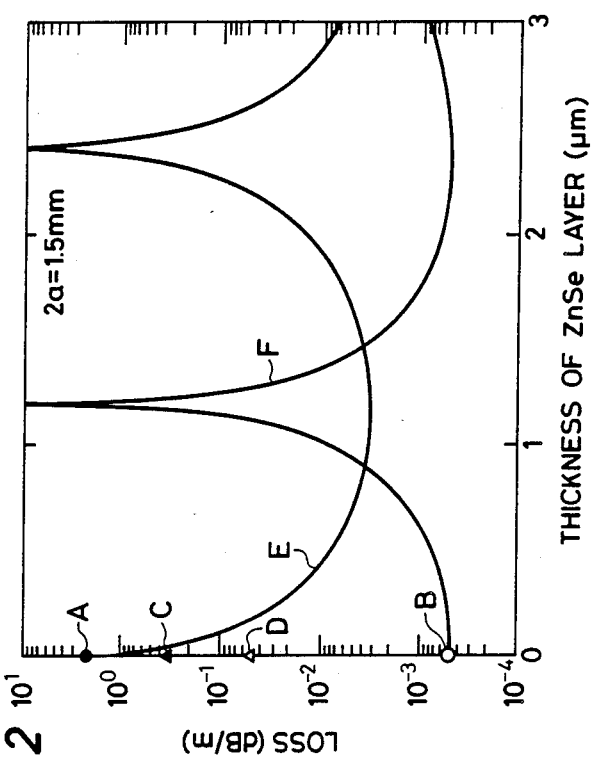
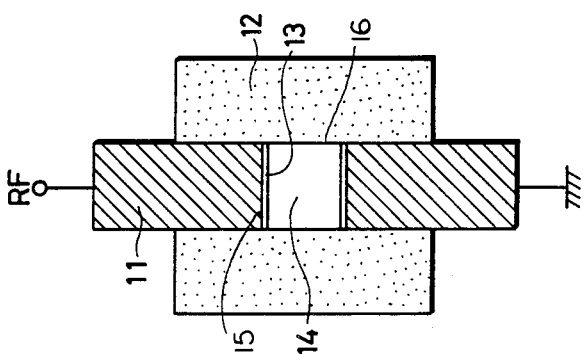

THIN-FILM COATED WAVEGUIDE LASER

BACKGROUND OF THE INVENTION

The present invention relates to a laser, and more particularly, to a compact waveguide gas laser of high efficiency which is effectively usable in the fields of laser material processing, coherent optical communications, and detection of enviromental pollutants, and so on.

Various waveguide lasers, each having a rectangular hollow waveguide defined by metal electrodes for producing a transverse RF discharge and dielectrics of materials such as glass or alumina, have been proposed, for instance, as disclosed by U.S. Pat. Nos. 4,169,251 and 4,352,188.

Such a transverse RF excited waveguide laser offers some advantages over a DC longitudinally excited waveguide laser in having a greater compactness, a wider tuning range, a higher efficiency (positive discharge impedance eliminates the necessity of ballast resistors), a lower excitation voltage, and longer service life due to the use of a sealed construction.

Another conventional laser, which has, instead of the composite metal-dielectric waveguide structure, all dielectric waveguide structure where the RF power is supplied to the laser gas through dielectric via external electrodes, has been known, as disclosed in an article by Christensen et al., "Transverse Electrodeless RF Discharge Excitation of High-Pressure Laser Gas Mixtures", IEEE J. Quantum Electronics, Vol. QE-16, No. 9, pages 949-954, September 1980. A waveguide laser of this type is advantageous in that it is possible to obtain a stable RF discharge and there is no ploblem associated with interaction of electrodes with the laser gas and/or sputtering of waveguide materials. However, there is a problem of relatively poor heat dissipation. In view of this problem, it is preferred to constitute the waveguide partially with metal materials such as aluminum and copper with a high thermal conductivity.

The thermal conductivities of glass, alumina, aluminum and copper are $3.2 \times 10^{-3}$ cal/cm-sec°C., 0.06 cal/cm-sec°C., 0.487 cal/cm-sec°C. and 0.923 cal/cm-sec°C., respectively. The thermal conductivity of beryllia, which is a good dielectric, is as high, about 0.5 cal/cm-sec°C., and hence is technically preferred as a waveguide material over materials such as glass and alumina; however, beryllia is quite toxic and therefore is generally not suitable in practice for this purpose.

In the case where metal electrodes constitute a portion of a waveguide, the narrower the width of the waveguide or the longer the length of the waveguide, the larger the waveguide loss, resulting in a lower laser output. In order to reduce the waveguide loss, it has been proposed to design the waveguide as a rectangular waveguide with enough space between opposing electrodes to eliminate the waveguiding effects of the electrodes. In such a structure, however, there may occur multi-mode oscillation in the widthwise direction of the space and/or an elliptical distribution of output beam intensity.

SUMMARY OF THE INVENTION

An object of the present invention is to provide a waveguide gas laser of high performance in which the problems inherent in the conventional laser as described above are eliminated.

According to the present invention, a thin film of material of a type described subsequently is formed on a surface of each of the electrodes constituting a portion of the waveguide so that the waveguide loss is very low and high efficiency laser oscillation is realized, even if the width of the waveguide is small. The thin film is made of a material with small absorption in the oscillation wavelength range. That is, the imaginary part of the complex refractive index of the material is negligible compared with the real part thereof. Such materials include ZnSe, Ge, KCl, NaCl, KRS-5, CdTe, Si, ZnS, PbF$_2$, and chalcogenide glass for a wavelength of 10.6 $\mu$m. Such materials, which are good transmission media for electromagnetic waves in the light frequency range, act as dielectrics and are not detrimental to the stability of the RF discharge.

On the other hand, the metal material of the electrodes may be Cu, Ag, Au and/or Al, materials for which the absolute value of the complex refractive index is substantially larger than that of dielectrics, and/or whose imaginary part of the complex refractive index is substantially larger than the real part thereof. (The complex refractive index of the above metal materials are 14.1-j64.5, 13.5-j75.2, 17.2-j56.0 and 20.5-j58.6, respectively at wave length of 10.6 $\mu$m.) Moreover, the thermal conductivity of these metals is high enough that satisfactory heat dissipation is obtained.

With metal electrodes coated with a thin film whose absorption is small, the electrodes function not only as normal electrodes, but also as waveguide walls constituting a low-loss waveguide, resulting in a compact, high-efficiency waveguide laser with a good cooling effect and without degradation of electrode surfaces.

BRIEF DESCRIPTION OF THE DRAWINGS

FIG. 1 shows a cross section of a preferred embodiment of the present invention;

FIG. 2 is a graph showing waveguide losses of various hollow slab waveguides of TM$_0$ and TE$_0$ modes;

DESCRIPTION OF THE PREFERRED EMBODIMENTS

Figure 3:
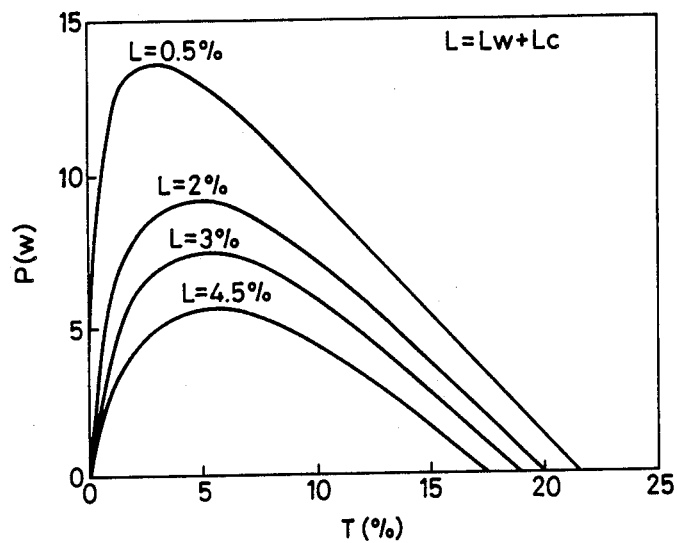
FIG. 3 is a graph showing the relation between an output power P of a laser of the invention and the average transmissivity T of the two opposing output mirrors.

In Fig. 1, which shows a schematic cross section of a waveguide laser constructed according to a preferred embodiment of the present invention, metal electrodes 11 and dielectric or lossy materials 12 define a hollow waveguide 14. On opposing surfaces of the metal electrodes 11, thin films 13 are formed. The metal electrodes 11 are connected through a matching network (not shown) to an RF power source and produce, when thus excited, a transverse RF discharge therebetween. The metal electrodes 11 may be made of copper with a high thermal conductivity. The dielectric or lossy materials 12 may be made of glass which provides a smooth surface, alumina exhibiting a comparatively high thermal conductivity, or polymers such as fluorine-contained polymers which are advantageous in terms of gas sealing. The thin films 13 may be made of zinc selenide and can be formed by sputtering or vacuum evaporation. When germanium is used for the thin films 13, the films can be formed by electrodeposition.

The hollow waveguide 14 has a substantially square ($2a \simeq 2b$) cross section to provide an output intensity distribution which is substantially circular. The hollow waveguide 14 is filled with a gas mixture of He, $CO_2$, $N_2$, etc. Opposite ends of the waveguide 14 are closed by flat or concave reflecting mirrors (not shown), an output laser light beam being extracted through the partially reflecting mirror.

In general, the laser output power P of a waveguide laser can be represented as follows:

$$P = I_s A T \left( \frac{g_o l}{L_w + L_c - T} - 1 \right) \quad (1)$$

$$T = \frac{T_1 + T_2}{2} \quad (2)$$

$$L_c = \frac{L_{c1} + L_{c2}}{2} \quad (3)$$

where $T_1$ and $T_2$ are the transmissivities of the two opposing mirrors respectively which, when one mirror is totally reflecting mirror ($T_1 = 0$), the transmissivity of another mirrors $T_2$ is equal to 2T. $L_{c1}$ and $L_{c2}$ are the respective coupling losses which, when the flat mirror is disposed close enough to the corresponding end of the waveguide, $L_c \lesssim 1.5\%$, l is the length of the waveguide, A is the effective mode cross-sectional area which, when the cross section of the waveguide is square ($2a = 2b$), is given by:

$$A = \pi (0.49a)^2 \quad (4)$$

$g_o$ is a small signal gain which, according to the scaling law for the pressure-broadened transition linewidth, is independent of the width of the waveguide, $I_s$ is the saturation intensity flux, which is proportional to the square of the gas pressure and inversely proportional to the square of the width of the waveguide, and $L_w$ is the waveguide loss.

In the waveguide laser shown in FIG. 1, it is possible to make $L_w$ smaller than that of the conventional laser of this type and hence obtain a compact, high efficiency laser. The waveguide loss $L_w$ of a rectangular waveguide is estimated by the sum of the waveguide losses of the TE and TM modes in a two-dimensional hollow slab waveguide.

FIG. 2 shows a plot of calculated transmission losses of $TM_0$ and $TE_0$ modes in a hollow-slab waveguide formed of copper, glass, and copper coated with zinc selenide, respectively. In FIG. 2, A and B are the losses in waveguides constituted with copper walls and having a width 2a operating in $TM_0$ and $TE_0$ modes, respectively, C and D are the losses in waveguides constituted with glass walls operating in the $TM_0$ and $TE_0$ modes, respectively, and E and F are losses in waveguides constituted with copper walls coated with zinc selenide operating in $TM_0$ and $TE_0$ modes, respectively.

As is apparent from FIG. 2, in the metal hollow waveguide constituted with copper walls having low-absorption thin films formed thereon, the loss of the TM mode with respect to that of the TE mode varies strongly in accordance with the thickness of the film. Also, these losses can be smaller than those of hollow dielectric waveguides. (This fact is disclosed in Miyagi et al., "Transmission Characteristics of Dielectric-Coated Metallic Waveguide for Infrared Transmission: Slab Waveguide Model", IEEE J. of Quantum Electronics, Vol. QE-10, No. 2, pages 136–143, February 1983.

As to the waveguide loss in the conventional waveguide laser having no thin films 13, assuming the lowest order mode in which the electric field vector is parallel to the surface of the metal electrodes 11 is referred to as the $E_{11}{}^X$ mode and the lowest order mode in which the magnetic field vector is parallel to the surface of the electrodes 11 is referred to as the $E_{11}{}^Y$ mode, the transmission loss $\alpha(E_{11}{}^X)$, in dB/m, of the $E_{11}{}^X$ mode is represented by:

$$\alpha(E_{11}^X) = \frac{0.543}{\lambda} \left\{ \left( \frac{\lambda}{b} \right)^3 Re \left[ \frac{1}{\sqrt{(n_m - jk_m)^2 - 1}} \right] + \left( \frac{\lambda}{a} \right)^3 Re \left[ \frac{(n_d - jk_d)^2}{\sqrt{(n_d - jk_d)^2 - 1}} \right] \right\} \approx \frac{1.97 \times 10^{-4}}{b^3} + \frac{1.39 \times 10^{-1}}{a^3} \quad (5)$$

where $\lambda$ is the wavelength and is assumed to be 10.6 $\mu$m, ($n_m - jk_m$) is the complex refractive index of the metal electrodes 11 (14.1-j64.5 for copper), ($n_d - jk_d$) is the complex refractive index of the dielectric or lossy materials 12 isolating the metal electrodes 11 from each other (2.1-j1.15 for glass), 2a is the width (in mm) of the waveguide defined between the dielectric or lossy materials 12, 2b is the width of the waveguide defined between the electrodes 11, and Re indicates the real part of a complex number. The first term of equation (5) corresponds to the waveguide loss of the $TE_0$ mode in a copper-slab waveguide, and the second term corresponds to the waveguide loss of the $TM_0$ mode in a glass-slab waveguide.

The transmission loss $\alpha(E_{11}{}^Y)$, in dB/m, of the $E_{11}{}^Y$ mode can be represented by:

$$\alpha(E_{11}^Y) = \frac{0.543}{\lambda} \left\{ \left( \frac{\lambda}{b} \right)^3 Re \left[ \frac{(n_m - jk_m)^2}{\sqrt{(n_m - jk_m)^2 - 1}} \right] + \left( \frac{\lambda}{a} \right)^3 Re \left[ \frac{1}{\sqrt{(n_d - jk_d)^2 - 1}} \right] \right\} \approx \frac{8.60 \times 10^{-1}}{b^3} + \frac{2.22 \times 10^{-2}}{a^3} \quad (6)$$

The first term of equation (6) corresponds to the waveguide loss of the $TM_0$ mode in a copper slab waveguide, and the second term corresponds to the loss of the $TE_0$ mode in a glass slab waveguide.

Therefore, in the conventional waveguide laser where $2a \simeq 2b$, the laser oscillates in the low-loss $E_{11}{}^X$ mode, and the loss is mainly determined by the $TM_0$ mode loss of the dielectric slab waveguide.

As mentioned previously with reference to FIG. 2, the transmission losses of the TE and the TM modes in the metal-slab waveguide coated by thin films with small absorptions vary periodically with the thickness of the thin film.

If the thickness t of the thin film satisfies:

$$t = \frac{\lambda_q}{4\sqrt{n_f^2 - 1}} \quad (7)$$

$$(q = 1, 3, 5 \ldots)$$

the transmission loss $\alpha(E_{11}^X)$, in dB/m, of the $E_{11}^X$ mode is represented by:

$$\alpha(E_{11}^X) = \frac{0.543}{\lambda} \left\{ \left(\frac{\lambda}{b}\right)^3 Re\left[\frac{\sqrt{(n_m - jk_m)^2 - 1}}{n_f^2 - 1}\right] + \left(\frac{\lambda}{a}\right)^3 Re\left[\frac{(n_d - jk_d)^2}{\sqrt{(n_d - jk_d)^2 - 1}}\right]\right\} \approx \frac{1.81 \times 10^{-1}}{b^3} + \frac{1.39 \times 10^{-1}}{a^3} \quad (8)$$

where $n_f$ is the refractive index of the thin films 13 ($n_f = 2.45$ for zinc selenide). The first term of equation (8) corresponds to the waveguide loss of the $TE_0$ mode in a zinc selenide-coated copper-slab waveguide, which varies strongly with the thickness of the thin film (as shown in FIG. 2), and the second term corresponds to the waveguide loss of the $TM_0$ mode in a glass slab waveguide.

The transmission loss $\alpha(E_{11}^Y)$, in dB/m of the $E_{11}^Y$ mode is represented by:

$$\alpha(E_{11}^Y) = \frac{0.543}{\lambda} \left\{ \left(\frac{\lambda}{b}\right)^3 Re\left[\frac{n_f^4}{(n_f^2 - 1)} \cdot \frac{\sqrt{(n_m - jk_m)^2 - 1}}{(n_m - jk_m)^2}\right] + \left(\frac{\lambda}{a}\right)^3 Re\left[\frac{1}{\sqrt{(n_d - jk_d)^2 - 1}}\right]\right\} \approx \frac{1.38 \times 10^{-3}}{b^3} + \frac{2.22 \times 10^{-2}}{a^3} \quad (9)$$

The first term of equation (9) corresponds to the waveguide loss the $TM_0$ mode in of a zinc selenide-coated copper-slab waveguide, and the second term corresponds to the waveguide loss of the $TE_0$ mode in a glass slab waveguide.

As will be clear from the foregoing, in a thin-film coated waveguide laser where $2a \simeq 2b$, the lower loss $E_{11}^Y$ mode becomes the propagation mode, and the total loss is mainly determined by the loss of the $TE_0$ mode in the dielectric slab waveguide. In the thin-film coated waveguide, the variations of the waveguide loss around the minimun value thereof with respect to the thickness of the film is relatively small, and therefore the thickness of the film is not always required to exactly satisfy equation (7).

The larger the absolute value of the complex refractive index $n_m - jk_m$ of the metal electrodes or the smaller the real part $n_m$ of the index compared with the imaginary part $k_m$ thereof, the smaller the first term of equation (9). Therefore, it may be preferred to use silver electrodes rather than copper electrodes. However, since silver is expensive, the amount of silver should be as small as possible. Thus, it may be advantageous to use a silver film between the copper electrodes 11 and the thin films 13. It is further possible to reduce the waveguide loss by forming the thin films with a lamination of at least two low-loss films having different refractive indices. In such a case, if the thickness $t_i$ of each film is selected so as to satisfy:

$$t_i = \frac{\lambda_q}{4\sqrt{n_{fi}^2 - 1}} \quad (10)$$

$$(q = 1, 3, 5, \ldots)$$

where $n_{fi}$ is the refractive index of the film. The waveguide loss can thus be most effectively reduced.

The second term of equation (9) decreases with an increasing absolute value of the complex refractive index of the dielectric or lossy materials or with a decreasing real part $n_d$ thereof with respect to the imaginary part $K_d$. Although glass was selected as the dielectric material used in this embodiment due to the smooth surface it provides, it may be possible to employ other dielectric materials which can provide a smooth surface, or dielectric materials whose thermal conductivity is high together with a thin film having a complex refractive index having a large absolute value or a real part which is small compared with the imaginary part.

In order to make the second term of equation (5) smaller at $\lambda = 10.6$ $\mu$m in the conventional waveguide laser, the use of alumina or beryllia has been considered. In the thin-film coated waveguide laser of the present invention however, there is no need of selecting as the dielectric materials whose values of $n_d$ and $k_d$ are small, and hence glass or fluorine-containing polymers may be used as the dielectric material for insulating between the electrodes.

FIG. 3 is a graph showing the relation of calculated output power P of the laser of the invention to the average transmissivity T of the two opposing output mirrors, with the loss being a parameter. For this laser, $2a = 2b = 1.5$ mm, $l = 40$ cm, $g_o = 0.005$ cm$^{-1}$, and $I_s = 20$ kW/cm$^2$. (As to determination of $g_o$ and $I_s$, see Abrams et al., "Characteristics of Sealed-Off Wavageuide CO$_2$ Lasers", IEEE J. of Quantum Electronicas, Vol. QE-9, No. 9, September 1978, pages 940–945.) In the conventional waveguide laser, $L_w = 3\%$ (according to equation (5)) and in the inventive thin-film coated waveguide laser, $L_w = 0.5\%$ (according to equation (9)). In FIG. 3, the coupling loss $L_c$ is assumed as being 0% and 1.5%, and curves are shown for $L_w + L_c = 0.5, 2, 3$ and 4.5%.

In equation (1), when $\partial P/\partial T = 0$, i.e., $$T = \sqrt{g_o(L_w + L_c)} - (L_w + L_c) \quad (11)$$

the output power P becomes the optimum output $P_{opt}$ and is represented by:

$$P_{opt} = I_s A \left[\sqrt{g_o l} - \sqrt{(L_w + L_c)}\right]^2 \quad (12)$$

Figure 4:
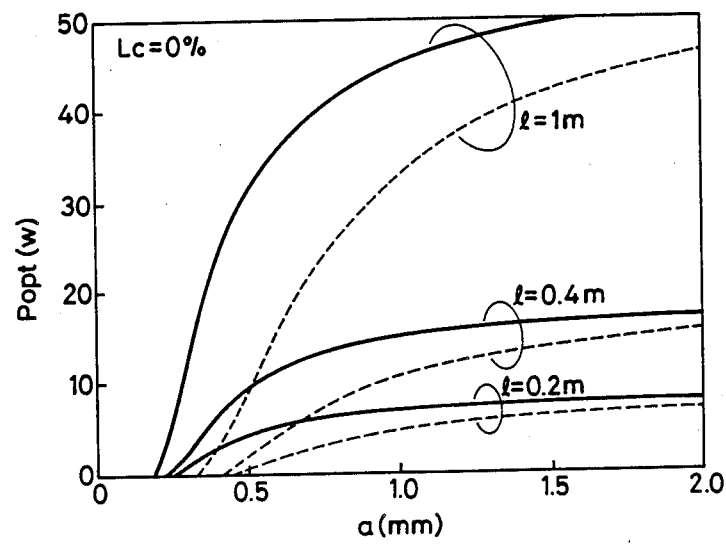
FIG. 4 is a graph showing the relation between the optimum output power of a laser of the invention and the width of the waveguide for coupling loss L$_c$=0%.
Figure 5:
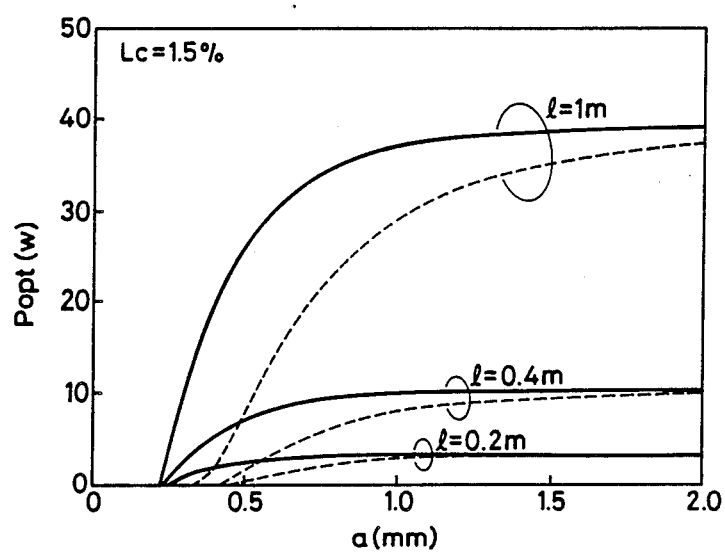
FIG. 5 is a graph showing the relation between the optimum output power and the waveguide width for coupling loss L$_c$=1.5%.

FIGS. 4 and 5 show optimum outputs for a waveguide half width a in mm for $L_c = 0\%$ and 1.5%, respectively, when the average transmissivity T of the two opposing output mirrors satisfies equation (11) and $2a=2b$, with the length l of the laser being a parameter. The saturation intensity $I_s$ is assumed as $I_s=11.25/a^2$ kW/cm² in view of the scaling law for pressure-broadened transition linewidth. Dotted curves in FIGS. 4 and 5 show the optimum output power of the conventional waveguide laser, and solid curves are those of the inventive thin-film coated waveguide laser. As is clear from FIGS. 4 and 5, the advantageous effects of the laser of the present invention become remarkable when the length thereof is larger as well as when the width of the waveguide is smaller.

As described hereinbefore, the laser of the invention is advantageous over the conventional waveguide laser in that, due to the low waveguide loss, high power oscillation is possible. Also, due to the use of a metal with high thermal conductivity for the walls of the waveguide, the cooling effect is large, making it possible to restrict the degradation of the metal electrodes due to sputtering and/or oxidation. Moreover, the freedom of selection of the dielectric or lossy materials for mutual insulation of the electrodes is very large.

It is another feature of the present invention that the laser oscillates in a mode in which the electric field has a component orthogonal with respect to the surfaces of the metal electrodes.

We claim:

1. A waveguide laser having a hollow waveguide defined by opposing metal electrodes and dielectric or lossy materials insulating said metal electrodes from each other, wherein the improvement comprises:

thin first films provided on opposed surfaces of said metal electrodes, said thin first films being made of a material whose absorption loss at an oscillation wavelength of said laser is low, wherein a thickness t of said thin films satisfies:

$$t \approx \frac{\lambda q}{4\sqrt{n_f^2 - 1}}$$

where $n_f$ is a refractive index of said thin first film, $\lambda$ is an oscillation wavelength of said laser, and q is an odd positive integer.

2. A waveguide laser having a hollow waveguide defined by opposing metal electrodes and dielectric or lossy materials insulating said metal electrodes from each other, wherein the improvement comprises:

thin first films provided on opposed surfaces of said metal electrodes, said thin first films being made of a material whose absorption loss at an oscillation wavelength of said laser is low; and a thin metal second film provided between each of said thin first films and the respective surfaces of said metal electrodes, said thin metal second film having a complex refractive index whose absolute value is larger than an absolute value of a complex refractive index of said metal electrodes.

3. The waveguide laser as claimed in claim 1 or 2, wherein said thin first films comprise a lamination of at least two low-absorption-loss layers having different refractive indices.

4. The waveguide laser as claimed in claim 3, wherein a thickness $t_i$ of each of said low-absorption-loss layers satisfies:

$$t_i \approx \frac{\lambda q}{4\sqrt{n_{fi}^2 - 1}}$$

where $n_{fi}$ is a refractive index of each of said low absorption loss layers, $\lambda$ is an oscillation wavelength of said laser, and q is an odd positive integer.

5. The waveguide laser as claimed in claim 1 or 2, further comprising a thin third film provided on opposed surfaces of said dielectric or lossy materials, said thin third film being made of a material having a complex refractive index whose absolute value is larger than an absolute value of a complex refraction index of said dielectrics or lossy materials.

6. The waveguide laser as claimed in claim 1 or 2, wherein said material of said thin first films provided on said surfaces of said electrodes is selected from the group consisting of ZnSe, Ge, KCl, NaCl, KRS-5, CdTe, Si, ZnS, PbF$_2$, and chalcogenide glass.

7. The waveguide laser as claimed in claim 1 or 2, wherein said dielectric or lossy materials are made of a material selected from the group consisting glass, ceramics, and polymers.

8. The waveguide laser as claimed in claim 1, further comprising: a thin metal second film provided between each of said thin first films and the respective surfaces of said metal electrodes, said thin metal second film having a complex refractive index whose real part is substantially smaller than an imaginary part thereof.

9. The waveguide laser as claimed in claim 1 or 8, further comprising a thin third film provided on opposed surfaces of said dielectric or lossy materials, said thin third film being made of a material having a complex refractive index whose real part is substantially smaller than its imaginary part.

10. The waveguide laser as claimed in claim 1, further comprising: a thin metal second film provided between each of said thin first films and the respective surfaces of said metal electrodes, wherein:

$$Re(\sqrt{(r_m - jk_m)^2 - 1}\,/(n_m - jk_m)^2)$$

is smaller than an absolute value of a complex refractive index of said metal electrode, where $n_m - jk_m$ is a complex refractive index of said thin metal second film.

11. The waveguide laser as claimed in claim 1 or 10, further comprising a thin third film provided on opposed surfaces of said dielectric or lossy materials, wherein:

$$Re(1/\sqrt{(n_d - jk_d)^2 - 1})$$

is smaller than an absolute value of a complex refractive index of said dielectric or lossy material, where $n_d - jk_d$ is a complex refractive index of said thin third film.

* * * * *